(12) United States Patent
Spink et al.

(10) Patent No.: US 7,758,828 B2
(45) Date of Patent: Jul. 20, 2010

(54) POLLUTION CONTROL IN WOOD PRODUCTS DRYER OPERATION

(75) Inventors: Edward F. Spink, Waterloo (CA); Robert A. Allan, Kitchener (CA)

(73) Assignee: Turbosonic Inc., Waterloo, Ontario ( * ) Notice: Subject to any disclaimer, the term of this patent is extended or adjusted under 35 U.S.C. 154(b) by 0 days.

(21) Appl. No.: 11/918,617

(22) PCT Filed: May 12, 2006

(86) PCT No.: PCT/CA2006/000755

§ 371 (c)(1),
(2), (4) Date: Dec. 24, 2008

(87) PCT Pub. No.: WO2006/119631

PCT Pub. Date: Nov. 16, 2006

(65) Prior Publication Data

US 2009/0123352 A1   May 14, 2009

Related U.S. Application Data

(60) Provisional application No. 60/680,013, filed on May 12, 2005.

(51) Int. Cl.
*B01D 53/38* (2006.01)
*B01D 53/74* (2006.01)
*F26B 3/00* (2006.01)
*F26B 21/00* (2006.01)

(52) U.S. Cl. .................. 423/210; 422/168; 422/187; 34/72; 34/79; 34/82; 34/90; 34/427; 34/467; 34/472; 34/480

(58) Field of Classification Search ............... 423/210; 422/168, 187; 34/72, 79, 82, 90, 427, 467, 34/472, 480
See application file for complete search history.

(56) References Cited

U.S. PATENT DOCUMENTS

| | | | | |
|---|---|---|---|---|
| 5,363,567 A | * | 11/1994 | Best | 34/271 |
| 7,160,358 B2 | * | 1/2007 | Spink et al. | 95/65 |
| 2005/0229780 A1 | * | 10/2005 | Spink et al. | 95/65 |

FOREIGN PATENT DOCUMENTS

WO   WO 2005/097297 A1   10/2005

* cited by examiner

*Primary Examiner*—Timothy C Vanoy
(74) *Attorney, Agent, or Firm*—Sim & McBurney

(57) ABSTRACT

Problems associated with deposition of contaminants from air streams in transport ducts in the wood products industry and other sources of such contaminants are at least minimized by close coupling a cyclone separator/scrubber to the source of the air stream.

14 Claims, 4 Drawing Sheets

POLLUTION CONTROL IN WOOD PRODUCTS DRYER OPERATION

This application is a national stage filing of PCT/CA2006/000755 filed on May 12, 2006, and claims benefit of provisional application Ser. No. 60/680,013 filed on May 12, 2005.

FIELD OF INVENTION

The present invention is concerned with pollution control in the wood products industry.

BACKGROUND OF THE INVENTION

The wood products industry has been beset with many problems with pollution control equipment and associated ductwork, including maintenance problems, unplanned downtime due to material build up in scrubbers and wet electrostatic precipitators (WESP) and in thermal oxidizer systems. Such thermal oxidizer systems include thermal catalytic oxidizer (TCO), regenerative thermal oxidizer (RTO) and regenerative catalytic oxidizer (RCO). Deposition of particulates and inorganic salts on ceramic media in such systems, causes plugging and deterioration of the ceramic media from chemical attack and blinding and loss of effectiveness of catalysts.

In typical installations, moist wood chips, sawdust, wood fiber or other wood products are dried in a dryer using a hot air stream and the dried wood products are transported in the air stream to a cyclone separator, where the wood chips are separated from the air stream and collected for processing into saleable products, such as panel board.

The air stream exiting the cyclone separator contains a variety of pollutants, including organic and inorganic vapours and particulates, hazardous air pollutants (HAPS) and volatile organic compounds (VOCs), which must be removed before the air stream can be vented from the system.

The air stream usually is passed through a transport duct to a quench duct or chamber, wherein the temperature of the air stream is cooled by water fed by hydraulic quench nozzles which are intended to saturate the air stream with moisture. Alternatively, the air stream may be fed through an insulated duct equipped with fire protection equipment in the form of water sprinklers. The cooled air stream then is fed to a scrubber for removal of a portion of the pollutants and then to the WESP for further pollutant removal.

A problem exists with respect to the duct leading to the quench section and recirculation duct to the energy system or dryer and that is the build-up of materials in the duct as a result of condensation of condensable materials and dropout of fibre and particulates as the temperature of the gas stream falls, causing maintenance problems and a fire hazard.

The present invention seeks to solve the connecting, recirculation and transport duct problems by modification to the pollution control equipment and procedures used in the wood products industry. The invention is illustrated, as disclosed below, by reference to pollution control of sawdust and wood chip dryer emissions, but the principles are applicable to pollution control to other wood products and biomass dryers and other sources of gas-borne pollution which lead to contaminant build up.

SUMMARY OF INVENTION

In the present invention, the transport duct and/or scrubber is decoupled from the WESP and the gas stream leaving the cyclone separator, is passed directly to a close coupled quench/scrubber where condensables and pollutants are removed before the gas stream is passed to the WESP/RTO/RCO/TCO/biofilter or stack.

In accordance with one aspect of the present invention, there is provided a method of removing gas-borne contaminants transported from an operation producing such gas-borne contaminants by a duct to a contaminant removal operation, wherein the duct is prone to build-up of contaminants deposited from the gas stream, the improvement which comprises eliminating the duct from exposure to untreated/unscrubbed process gases.

In accordance with another aspect of the present invention, there is provided an apparatus for removing gas-borne contaminants transported from an operation producing such gas-borne contaminants by a duct to a contaminant removal operation, wherein the duct is prone to build up of contaminants deposited from the gas stream, the improvement which comprises eliminating the duct from exposure to untreated/unscrubbed process gases.

GENERAL DESCRIPTION OF INVENTION

The basic premise of the present invention is to alter the conventional close coupled quench/scrubber/mist eliminator/WESP system that follows a substantial length of connecting duct prone to contaminant deposition and/or fire, which may be followed by an RTO, RCO, TCO or biofilter, and place the quench/scrubber/mist eliminator in a close coupled fashion directly after the dryer product cyclone (primary) or, in the case of a panel board forming operation, directly after the press unit. By providing such close coupling, contaminant deposition and the resultant fire hazard in the connecting duct leading to the WESP and/or RTO/RCO/TCO oxidizer or biofilter or stack are at least minimized. These ducts are otherwise prone to deposition of contaminants, which may lead to duct fires. The current systems require a maintenance intensive or marginally effective insulated, heated and/or irrigated connecting duct leading to the normally situated quench/scrubber/RTO/RCO/TCO/biofilter or stack prior to atmospheric release.

This invention eliminates the need for wash sprays, irrigation system, insulation or heated ducts to prevent contaminant build-up and/or fire hazard.

DESCRIPTION OF PREFERRED EMBODIMENT

Figure 1:
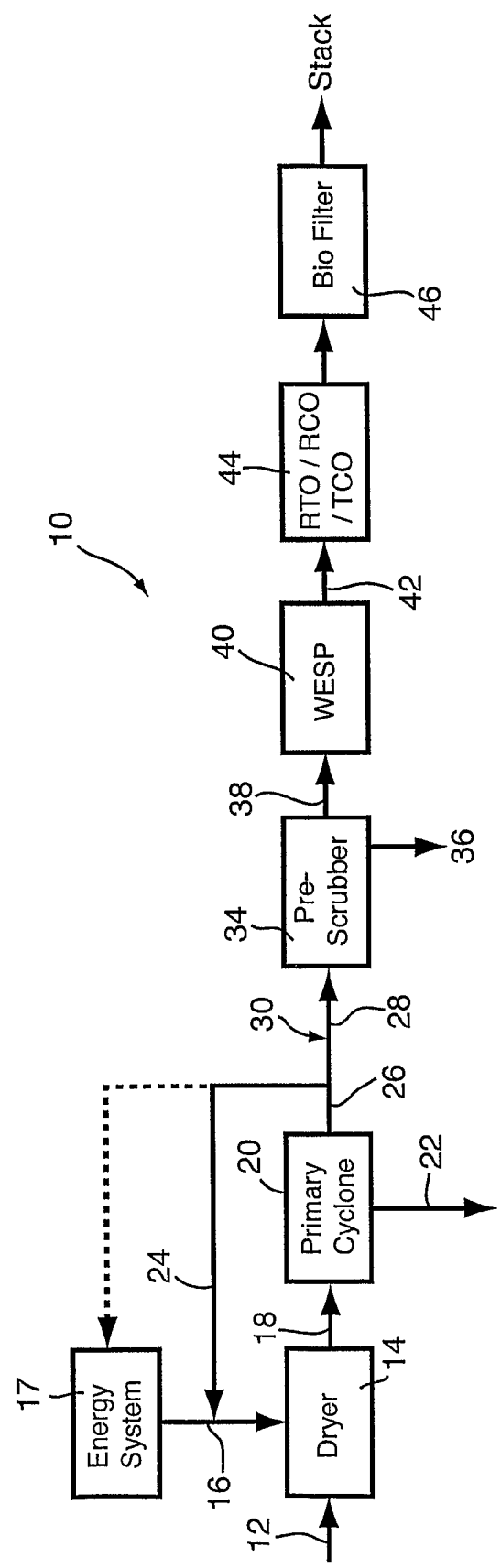
FIG. 1 is a schematic flow sheet of a typical prior art wood products dryer operation.

Referring to the drawings, FIG. 1 is a schematic flow sheet of a prior art wood products dryer pollution control operation 10.

Moist wood chips, sawdust, wood fiber, or other wood products or biomass, such as rice hulls, soybean hulls and straw are fed by line 12 to a dryer 14 wherein they are dried by a heated air stream 16 produced by an energy system 17 and the dried chips are transported in the air stream by line 18 to a cyclone separator 20, wherein the dried chips are separated from the air stream and collected by line 22 for product production. These elements are standard elements of a wood particle or wood chips dryer operation.

A portion of the air stream from the cyclone separator may be recycled by line 24 to the air inlet 16 to the dryer 14 and/or to the energy system 17. This arrangement reduces the gas flow in the remaining elements of the system, including any WESP and any downstream RTO/RCO/TCO/biofilter or stack.

The air stream exiting the cyclone separator in line 26 contains a variety of pollutants, including organic and inorganic volatiles or particulates, HAPS, and VOCs, which must be removed before the air stream can be vented from the system to atmosphere.

The air stream first is passed through a transport duct and/or scrubber 28, wherein the temperature of the gas stream is cooled by water fed by hydraulic quench nozzles 30 or other means, such as a venturi and also intended to saturate the air stream with moisture, which is necessary for efficient WESP operation. Alternatively, the dust may be a double-walled insulated duct, which may be equipped with sprinklers for fire hazard control.

The gas stream next is passed to a cyclonic separator/scrubber 34 for removal of some contaminants. This separation also may take the form of mesh pads and chevrons.

The gas stream then is passed by line 38 to an optional WESP 40. The gas stream exiting the WESP by line 42 may be passed to a RTO/RCO/TCO biofilter 44 before being discharged 46 to stack.

As noted above, a problem with the conventional arrangement is the condensation of condensibles and pollutant deposition in the transport duct 28, causing a build up of materials in the transport duct 28, leading to maintenance problems and/or fire hazards.

Figure 2:
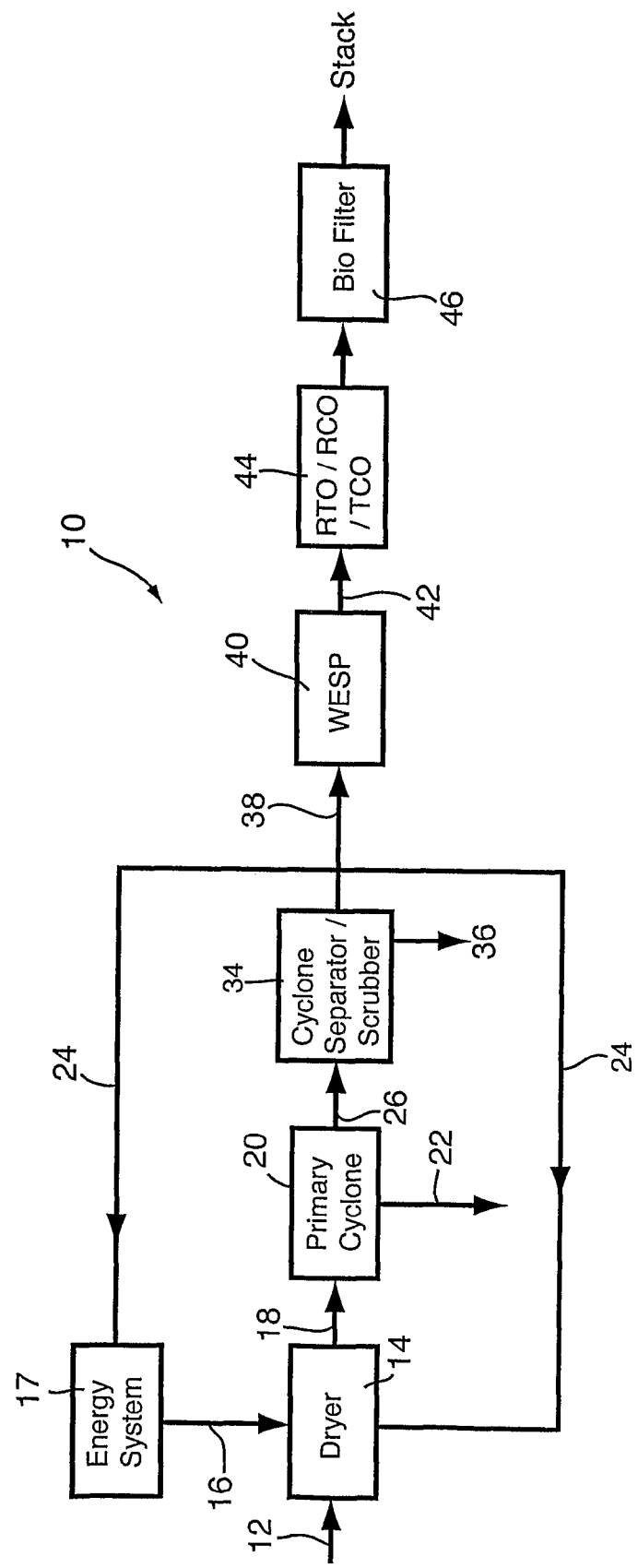
FIG. 2 is a schematic flow sheet of a wood products dryer operation according to one embodiment of the invention.

FIG. 2 is a schematic flow sheet of an embodiment of the present invention. As may be seen therein, the transport duct 28 with associated nozzles, insulation and fire sprinklers 30 are eliminated and the gas stream 26 leaving the cyclone separator 20 is passed directly to the cyclone separator/scrubber 34 before the resulting gas stream is passed by line 38 to the WESP 40 or other downstream equipment (RCO/RTO/TCO/biofilter or stack). The cyclone separator/scrubber 34 has the effect of removing contaminants by cyclone separation and water scrubbing, which may cool and quench the gas stream, if at elevated temperature.

By close coupling the scrubber to the product cyclone separator 20 or recirculation duct 24 and placing it before the connecting duct leading to the WESP/RTO/RCO/TCO/biofilter or stack, the potential for build-up of condensibles and dropout of other pollutants in such ducts is minimized/eliminated and with it the maintenance problems and fire hazard associated therewith. The relocated quench/scrubber (venturi) also removes particles and other pollutants and condensables from the airstream.

The gas stream 26 enters the mouth of the venturi 102 which is maintained wet by a swirl of water 104 to avoid a wet-dry interface where build-up may occur. The gas stream then enters the venturi throat 106 to which water is fed by line 108.

The gas stream, saturated and cooled to the adiabatic dew point, exits the downstream end of the venturi 110 and passes tangentially into a separation chamber 112. The cyclonic flow of the gas stream in the separation chamber 112 results in particulates and particulate-laden droplets impinging on the wall of the separation chamber and running down the wall to a lower outlet 114.

Figure 3A:
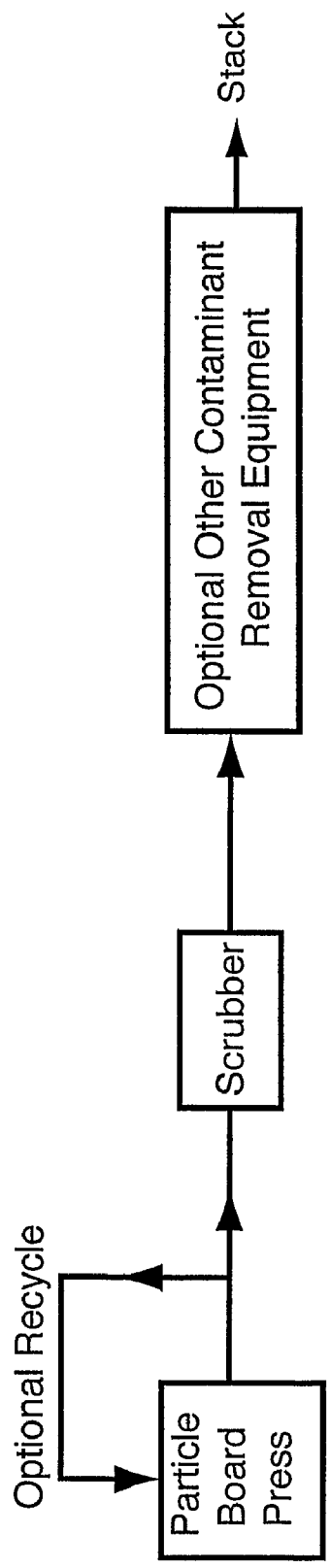
FIGS. 3A and 3B illustrate the application of the principles of the present invention to a wood products press.
Figure 3B:
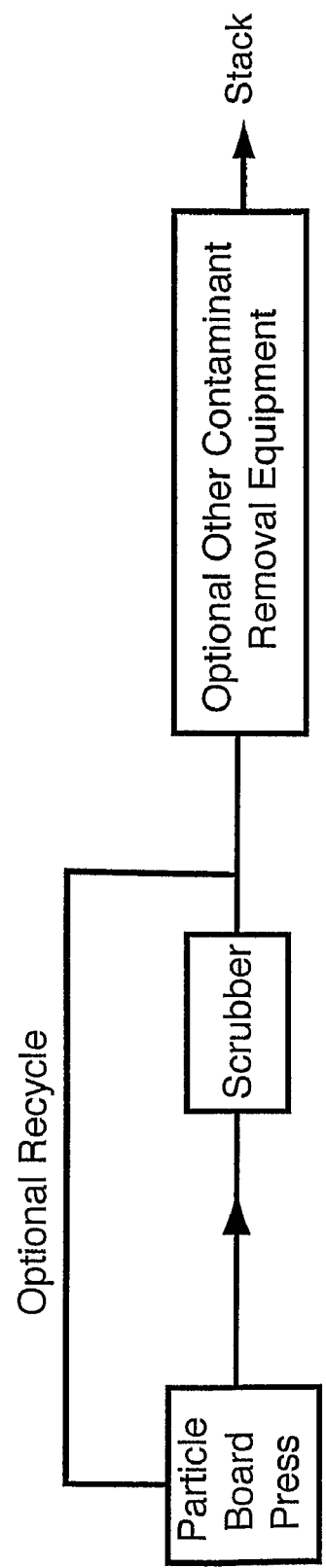
Figure 4:
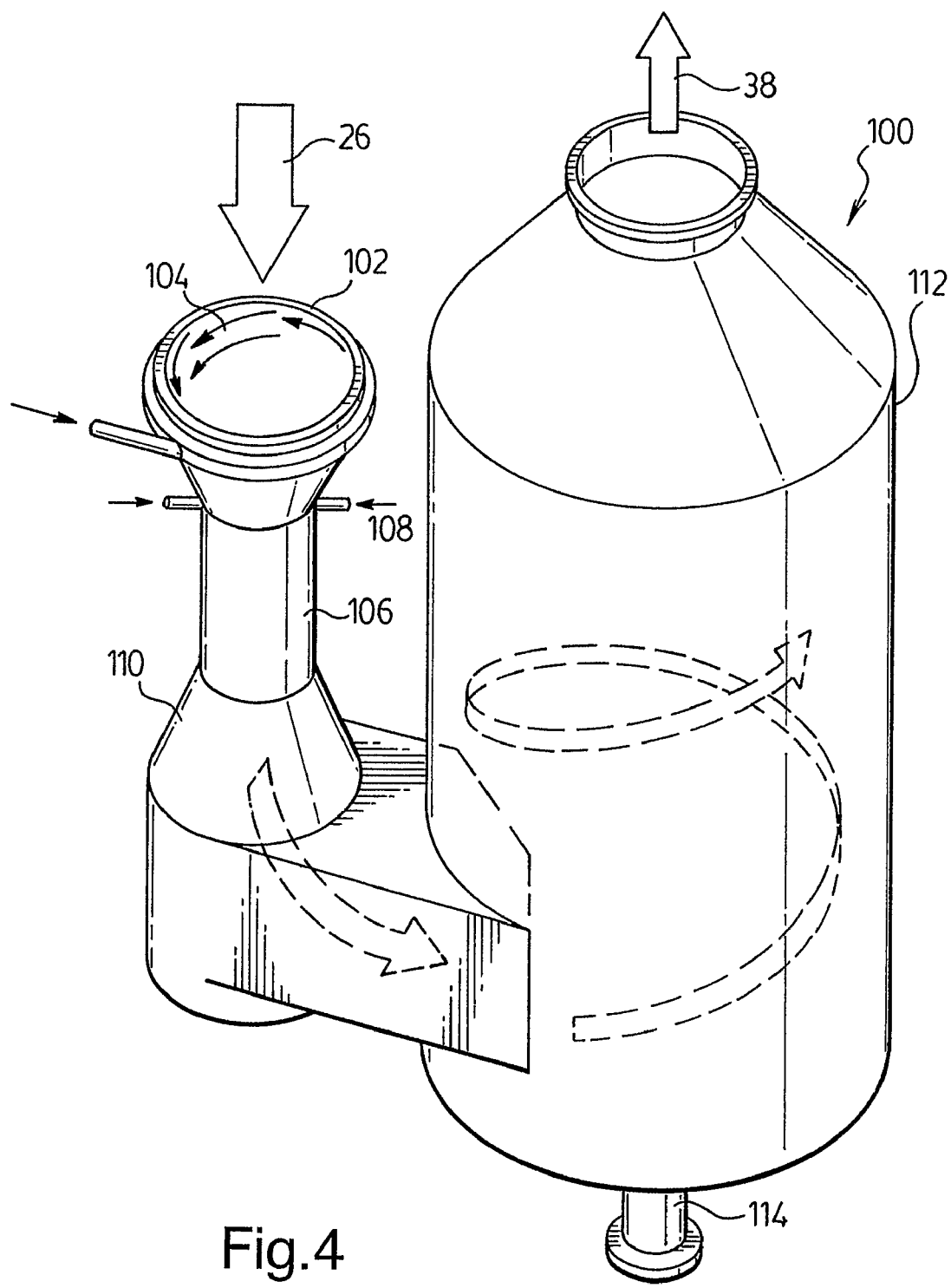
FIG. 4 is a perspective view of a combined cyclone separator, contaminant scrubber and air stream quencher which may be used in one embodiment of the invention.

The principle of the present invention also applies to a press vent from a particle board manufacturing operation recirculation loop and duct and this is illustrated in FIGS. 3A and 3B, with FIG. 3A being the conventional arrangement and FIG. 3B being the application of the principle of the present invention to the conventional arrangement of FIG. 3A.

SUMMARY OF DISCLOSURE

In summary of this disclosure, maintenance and fire hazard problems associated with transport ducts in the removal of contaminants from air stream produced in wood product dryers are minimized/eliminated. Modifications are possible within the scope of the invention.

The invention claimed is:

1. A method of removing gas-borne contaminants transported from an operation producing gas-borne contaminants by a duct to a contaminant removal operation, wherein the duct is prone to build up of contaminants deposited from the gas stream, the improvement which comprises eliminating the duct and wherein the operation producing gas-borne contaminants comprises a wood products dryer operation wherein moist wood chips, sawdust, wood fiber or other wood products or biomass are dried in a dryer using a hot air stream and dried wood products are transported in the air stream to a cyclone separator where the wood products are separated from the air stream and collected for processing into saleable products.

2. The apparatus of claim 1 wherein the contaminant removal operation includes a combined cyclone separator, contaminant scrubber and air stream quencher.

3. The apparatus of claim 2 wherein said contaminant removal operation further includes a wet electrostatic precipitator.

4. The apparatus of claim 3 wherein said contaminant removal operation further includes a thermal oxidizer system and/or biofilter.

5. The apparatus of claim 4 wherein the thermal oxidizer system is a thermal catalytic oxidizer, regenerative thermal oxidizer or regenerative catalytic oxidizer.

6. The apparatus of claim 1 wherein a portion of the air stream is recycled.

7. The apparatus of claim 1 wherein the operation producing gas-borne contaminants is a panel board manufacturing operation wherein wood particles are formed into panel board using thermosetting adhesive and gaseous by-products are vented.

8. In an apparatus for removing gas-borne contaminants transported from an operation producing such gas-borne contaminants by a duct to a contaminant removal operation, wherein the duct is prone to build up of contaminants deposited from the gas stream, the improvement which comprises eliminating the duct and wherein the operation producing gas-borne contaminants comprises a wood products dryer operation wherein moist wood chips, sawdust, wood fiber or other wood products or biomass are dried in a dryer using a hot air stream and dried wood products are transported in the air stream to a cyclone separator where the wood products are separated from the air stream and collected for processing into saleable products.

9. The apparatus of claim 8 wherein the contaminant removal operation includes a combined cyclone separator, contaminant scrubber and air stream quencher.

10. The apparatus of claim 9 wherein said contaminant removal operation further includes a wet electrostatic precipitator.

11. The apparatus of claim 10 wherein said contaminant removal operation further includes a thermal oxidizer system and/or biofilter.

12. The apparatus of claim 11 wherein the thermal oxidizer system is a thermal catalytic oxidizer, regenerative thermal oxidizer or regenerative catalytic oxidizer.

13. The apparatus of claim 8 wherein a portion of the air stream is recycled.

14. The apparatus of claim 8 wherein the operation producing gas-borne contaminants is a panel board manufacturing operation wherein wood particles are formed into panel board using thermosetting adhesive and gaseous by-products are vented.

* * * * *